(12) United States Patent
Pursell et al.

(10) Patent No.: US 8,758,474 B2
(45) Date of Patent: Jun. 24, 2014

(54) UREA FERTILIZER CONTAINING CENTRAL VOLATILIZATION INHIBITOR PARTICLES TO REDUCE RELEASE OF AMMONIA AND PROCESSES FOR MAKING SAME

(75) Inventors: Taylor Pursell, Mountain Brook, AL (US); Arthur R. Shirley, Jr., Florence, AL (US); Keith D. Cochran, Killen, AL (US); Joseph M. Miller, Killen, AL (US); Timothy G. Holt, Florence, AL (US); Gregory S. Peeden, Killen, AL (US)

(73) Assignee: NFT Industries, LLC, Mountain Brook, AL (US)

( * ) Notice: Subject to any disclaimer, the term of this patent is extended or adjusted under 35 U.S.C. 154(b) by 282 days.

(21) Appl. No.: 13/071,286

(22) Filed: Mar. 24, 2011

(65) Prior Publication Data

US 2012/0067094 A1   Mar. 22, 2012

Related U.S. Application Data

(60) Provisional application No. 61/317,640, filed on Mar. 25, 2010.

(51) Int. Cl.
| | | |
|---|---|---|
| *C05D 9/00* | (2006.01) | |
| *C05D 9/02* | (2006.01) | |
| *C01C 1/18* | (2006.01) | |
| *C05C 3/00* | (2006.01) | |
| *A01N 25/00* | (2006.01) | |
| *C05C 9/00* | (2006.01) | |
| *C05G 3/00* | (2006.01) | |
| *C05B 1/00* | (2006.01) | |
| *B01J 2/00* | (2006.01) | |
| *B01J 2/30* | (2006.01) | |

(52) U.S. Cl.
CPC ............... *C05C 9/00* (2013.01); *C05G 3/0041* (2013.01); *C05B 1/00* (2013.01); *C05D 9/02* (2013.01); *B01J 2/003* (2013.01); *B01J 2/30* (2013.01)
USPC ........................ 71/54; 71/31; 71/61; 71/64.04

(58) Field of Classification Search
CPC .......... C05C 9/00; C05G 3/0041; C05G 3/08; C05B 1/00; C05D 9/02; B01J 2/003; B01J 2/30
USPC ........................................ 71/31–36, 54, 64.07
See application file for complete search history.

(56) References Cited

U.S. PATENT DOCUMENTS

| 6,576,035 B2 | 6/2003 | Hartmann et al. |
| 7,785,388 B2 | 8/2010 | Hartmann et al. |

OTHER PUBLICATIONS

Sloan et al. "Calcium chloride and ammonium thiosulfate as ammonia volatilization inhibitors for urea fertilizers": Abstract. Communications in Soil Science and Plant Analysis. vol. 26, Issue 15-16, 1995 pp. 2425-2447.*

*Primary Examiner* — Jennifer A Smith
(74) *Attorney, Agent, or Firm* — Paul E. White, Jr.; Manelli Selter PLLC

(57) ABSTRACT

A urea fertilizer having reduced ammonia volatilization upon application to soil including a central particle having an outer surface and comprising ammonia volatilization inhibiting compounds containing one or more of boron and iodine, and a coating of urea on the outer surface of the central particle, and further a process of making the fertilizer including the steps of: granulating ammonia volatilization inhibiting compounds containing one or more of boron and iodine, with a binder to produce volatilization inhibitor particles; screening the inhibitor particles to a preselected particle size; spraying melted urea onto the surface of the inhibitor particles to produce a coating on the inhibitor particles; granulating the coated inhibitor particles with sprayed melted urea to produce granules of urea coated central volatilization particles; and cooling the granules.

15 Claims, 4 Drawing Sheets

UREA FERTILIZER CONTAINING CENTRAL VOLATILIZATION INHIBITOR PARTICLES TO REDUCE RELEASE OF AMMONIA AND PROCESSES FOR MAKING SAME

This application claims the benefit of U.S. Provisional Application No. 61/317,640, filed Mar. 25, 2010.

BACKGROUND OF THE INVENTION

The present invention is directed towards new and entirely unexpected urea fertilizers having reduced ammonia volatilization. The present fertilizers are in a granular form and contain a central fertilizer particle of ammonia volatilization inhibitor. The inhibitor reduces ammonia volatilization resulting from the break down of urea when urea fertilizer granules are applied to soil.

From an economical and environmental stand point it is becoming increasingly important to improve efficiency of nitrogen delivery to plants from fertilizers. One method to improve nitrogen delivery efficiency is to reduce nitrogen losses due to volatilization. Urea, $CO(NH_2)_2$, is a white crystalline solid containing 46% nitrogen and is widely used in the agricultural industry as a fertilizer. Volatilization of ammonia occurs when urea is broken down in the soil. In order for plants to absorb nitrogen from urea, the urea must first be chemically decomposed as follows:

Urease is an enzyme that catalyzes the hydrolysis of urea, ultimately into carbon dioxide and ammonia. Urease is most commonly found in bacteria, but also in fungi such as yeast and several higher plants.

Thus in soil, urease is a naturally occurring microbe enzyme that catalyzes the hydrolysis of urea to carbamic acid ($H_2NCOOH$). Carbamic acid is unstable. Decomposition of carbamic acid occurs without enzyme catalysis to form ammonia and carbon dioxide. Ammonia will be volatilized or released to the atmosphere unless reacted with water as follows:

The present invention is believed to inhibit ammonia volatilization from urea by several mechanisms, but important mechanisms are believed to be the inhibition of urease producing microbes, or by one mechanism or another, interference with urease activity.

Ammonia losses can be reduced when a urease inhibitor is applied with or within a urea fertilizer. There are several known approaches to employing fertilizers and reduce ammonia losses. One approach employs the inhibitor, calcium cyanamide, as in the product, Stabl-U™, made by Bi-En Corp and described in U.S. Pat. No. 6,576,035, which comprises calcium cyanamide particles that are coated with urea. Another approach uses the most common inhibitor, NBPT (N-[n-butyl]thiophosphoric triamide), sold under the trade name Agrotain®. This product is applied as a coating to the outside surface of urea particles which prevents urease enzyme from breaking down urea for up to 14 days.

Boric acid and other boron compounds have been used as urease inhibitors for reducing ammonia volatilization of urea fertilizers (U.S. Pat. No. 3,565,599; U.S. Pat. No. 3,523,018; and U.S. Pat. No. 6,830,603). A coating product has been commercialized from these patents, produced by Weyerhaeuser, called Arborite®. Arborite is a reacted boric acid coating that may be used to coat the outside surface of fertilizer particles.

The melting point of urea is 270-275° F. A processing problem that is associated with combining urea and boric acid is that when boric acid is heated to a temperature equal to or greater than 158° F., boric acid starts to melt and decompose as follows:

The water formed by the above decomposition can cause process and product problems. The presence of high moisture content in the product urea melt may be detrimental to a urea granulation process such as causing unwanted particle agglomeration and dust formation. Product quality is diminished due to low particle strength. Storage and handling properties will be undesirable due to high moisture, and low particle strength leads to caking in bulk piles or bags.

Urea containing boric acid has a lower critical relative humidity of 50% compared to urea alone which has a critical relative humidity of 72%. This means that urea having a boric acid based coating or urea mixed with boric acid will absorb moisture from the atmosphere at a lower humidity than urea alone.

In the prior art there are other known techniques used for applying boric acid to fertilizer granules. These techniques include dissolving boric acid into water, or reacting boric acid with amino alcohols, and then apply the resulting fluid to the outside surface of the urea granules. This method is disadvantageous because it requires an additional drying step. Further, particle surface area varies with particle size (proportionately less surface area as particle diameter increases) and thus limits the proportional amount of boric acid that can be applied to the surface. Surface application is also limited to the amount that will adhere to the surface. From a manufacturing viewpoint, surface application disadvantageously exposes manufacturing personnel to boric acid dust generated by handling.

Another method for incorporating boric acid into a urea containing fertilizer granule is to add these components to the urea melt prior to granulation resulting in a homogenously mixed fertilizer granule. A disadvantage of adding boric acid to the melt is that dust generated during the manufacturing process will contain boric acid and potential personnel exposure to the dust. Inhalation is the most significant route of exposure in occupational settings.

Due to these aforementioned potential problems, it is believed that these types of products were never produced commercially.

BRIEF SUMMARY OF THE INVENTION

The fertilizers of the present invention are in a granular form and contain a central fertilizer particle of ammonia volatilization inhibitor. The present invention is believed to inhibit ammonia volatilization from urea by several mechanisms, including the inhibition of urease producing microbes and/or by interference with urease activity.

Embodiments of the present invention include a central fertilizer particle comprised at a minimum of an ammonia volatilization inhibitor agent and an over-coating of urea to result in fertilizer granules that are applied to soil. The ammonia volatilization inhibitor include for example, boron and/or iodine compounds.

The physical structure of the present fertilizer product is novel and the process of the present invention that was developed for making the product, including the central volatilization inhibitor particle and one or more coatings, includes novel granulation steps.

Principal embodiments of the present invention include urea coated central particle of boron and/or iodine compounds and are thought to have an anti-microbial effect. In further embodiments of the present invention, the central particle includes anti-microbial agents, primarily acting as bactericides, which include disinfectants, cationic surfactants, weak acids and sulfonamides.

DETAILED DESCRIPTION OF THE INVENTION

The present invention relates to a central fertilizer particle comprised at a minimum of an ammonia volatilization inhibitor and an over-coating of urea to result in fertilizer granules that are applied to soil. The fertilizer granules are preferably applied to the soil surface, but may also be applied below the soil surface. The present invention is believed to inhibit ammonia volatilization from urea by several mechanisms, including the inhibition of urease producing microbes and/or by interference with urease activity. Thus, in some embodiments, the present invention employs an agent that inhibits urease producing microbes and/or an agent that inhibits urease activity.

One embodiment of the present invention employs an ammonia volatilization inhibitor which is a boron compound. The boron compound is one compound or a combination of several boron compounds, but is preferably boric acid. The boric acid is contained in the central particle and inhibits ammonia volatilization from the break down of urea when urea fertilizer granules of the present invention are applied to soil. Other exemplary boron compounds employed in the present invention include sodium tetraborate pentahydrate ($Na_2B_4O_7 \cdot 5H_2O$), sodium tetraborate decahydrate ($Na_2B_4O_7 \cdot 10H_2O$), and anhydrous sodium tetraborate ($Na_2B_4O_7$).

For example, when the boron compound is boric acid, the central particle is entirely composed of boric acid.

In another embodiment of the present invention, the ammonia volatilization inhibitor is an iodine compound or a combination of iodine compounds, but is preferably potassium iodine (KI). Other iodine compounds include sodium iodine (NaI), potassium iodate ($KIO_3$) and sodium iodate ($NaIO_3$).

For example, when the iodine compound is potassium iodine, the central particle is entirely composed of potassium iodine.

The iodine compound may be combined with a boron compound to comprise the central particle, for example, a central particle composed of potassium iodide and boric acid.

The central particle provides a unique combination of a boron compound, or an iodine compound, or a combination of boron and iodine compounds with urea by means of urea overcoating the particle, to yield a urea fertilizer that effectively reduces volatilization of ammonia upon application of the fertilizer to soil.

The central particles are over coated with urea and results in a single coated final product. Alternatively, the first coating of urea on the central particle may be a first of two coatings, wherein the first coating is to build up the particle size for improved processing by such means as a high or even low flow fluid bed reactor to produce the fertilizer product granules, prior to receiving a second coating of urea. In this alternative, the central volatilization inhibitor particles with a single urea overcoat is an intermediate product, which may be stored or processed substantially immediately to a final fertilizer granular product.

When the central volatilization inhibitor particle contains both boric acid and potassium iodide, then illustrative of such combination products are the following product samples, identified by reference number, VOL-37, NP-2 and NP-17, which are described in the EXAMPLES section of this application:

| | |
|---|---|
| VOL-37 | Containing boric acid at 0.3% boron and potassium iodide at 0.3% iodide |
| NP-2 | Containing 1% boric acid and 1% potassium iodide |
| NP-17 | Containing 1.7% boric acid and 1.3% potassium iodide |

In a further embodiment of the invention, the central particle contains in addition to boron compounds (e.g., boric acid) and/or iodine compounds (e.g., potassium iodine), such plant macronutrients (also known as primary nutrients) as potassium and phosphorus. In still further embodiments, the central particle contains boron and/or iodine and additionally contains one or more macronutrients and/or one or more secondary nutrients such as calcium, magnesium, and sulfur. The central particle may additionally contain one or more micronutrients such as copper, iron, manganese, molybdenum, and zinc.

The plant macronutrient compounds more particularly include the following:

1) nitrogen compounds selected from the group consisting of urea, ammonia, ammonium nitrate, ammonium sulfate, calcium nitrate, diammonium phosphate, monoammonium phosphate, potassium nitrate and sodium nitrate;

2) phosphorous compounds selected from the group consisting of diammonium phosphate, monoammonium phosphate, monopotassium phosphate, dipotassium phosphate, tetrapotassium pyrophosphate, and potassium metaphosphate.

3) potassium compounds selected from the group consisting of potassium chloride, potassium nitrate, potassium sulfate, monopotassium phosphate, dipotassium phosphate, tetrapotassium pyrophosphate, and potassium metaphosphate.

In soil deficient in animal and more particularly, human nutrients, embodiments of the present invention include animal (human) nutrients in the central particle. More preferably, the human nutrients include iron, zinc and iodine compounds, but also include copper, magnesium and selenium compounds. Sources for these human nutrients include iron sulfate, iron oxides, chelated iron, zinc sulfate, iron nitrate, zinc oxide, chelated zinc, copper oxide, copper sulfate, copper nitrate, magnesium nitrate, magnesium sulfate, magnesium oxide, selenium sulfate and selenium oxide. The iodine compound is preferably potassium iodine (KI) and other iodine compounds include sodium iodine (NaI), potassium iodate ($KIO_3$) and sodium iodate ($NaIO_3$).

In a further embodiment, the central particles may also include a vitamin-mineral composition to alleviate or eliminate human vitamin deficiencies. One or more vitamins are selected from such vitamins as vitamins A, C, D, E and K, thiamin, riboflavin, niacin, vitamin B6 and B12, folic acid (vitamin B9), pantothenic acid (vitamin B5) and biotin (vitamin B7). In addition to the above described human nutrients of iron, zinc and iodine, additional mineral nutrients are selected from calcium, phosphorus, magnesium, selenium, copper, manganese, chromium, molybdenum, chloride, potassium, boron, nickel, silicon, tin, vanadium, and carotenoids such as lutien, and lycopene.

While the central particle may contain iodine to reduce volatilization of ammonia, particles prepared for regions that have iodine deficient soils contain 0.01 to 5% by wt. iodine, and more preferably contain 0.01 to 1.0% by wt. For zinc deficit soils, the central particles typically contain 0.01 to 10% wt. zinc and more preferably 0.01 to 5% wt. zinc. For iron deficit soils, the central particle typically contain 0.01 to 10% wt iron and more preferably contain 0.01 to 4% wt. iron.

The above described embodiments of the present invention, including boron and iodine compounds, may have an anti-microbial effect. In the presently described embodiment of the present invention, the central particle includes anti-microbial agents, primarily acting as bactericides, comprising the following classes and exemplary compounds thereof:
Disinfectants
1) Sodium or potassium hypochlorite disinfectant.
2) Peroxides such as peracetic acid, potassium persulfate, sodium perborate, sodium percarbonate, urea perhydrate.
Cationic Surfactants
1) quaternary ammonium cations including benzalkonium chloride, cetyl trimethylammonium bromide or chloride, didecyldimethylammonium chloride, cetylpyridinium chloride and benzethonium chloride.
2) non-quaternary compounds, such as chlorhexidine, glucoprotamine and octenidine dihydrochloride).
Weak Acids
Weak organic acids such as sorbic acid, benzoic acid, lactic acid and salicylic acid.
Sulfonamides
Sulfonamides including Sulfaisodimidine, Sulfanilamides, Sulfadiazine, Sulfamethoxazole, Sulfadimethoxine and Sulfamethoxypyridazine.
Processes for Making the Product of the Present Invention The processes for making the product of the present invention are disclosed in several embodiments.

In one embodiment of the invention, the central particle is formed by granulating a fine powder (50 to 150 microns) of boric acid using a binder such as corn syrup, other sugars, starches, lignosulfonates, PVA (polyvinyl acetate), methyl cellulose, and any other binders commonly used for granulation. Corn syrup is preferably used as the binding agent. The range of binding agent required on a dry basis is from 0.3 to 0.9% by wt., but more preferably, 0.5 to 0.7% by wt. Further fertilizer components may be added to the central particle to provide nutrients, including macronutrients, micronutrients, animal nutrients and/or antimicrobial agents, as agronomical conditions warrant. Thus, the resulting central particle size is in the range of 0.7 mm to 1.5 mm and preferably in the range of 0.9 mm to 1.2 mm in diameter depending on the desired additive concentration. The granulation method for preparing the central particles can be one of a number of commonly used techniques such as drum granulation, pan granulation, pin-mixer, extrusion, compaction, and others. Drum granulation is the preferred method to forming the central particles.

The central particles are over coated with urea in two different embodiments of the present invention as follows:

1) The coating in one embodiment of the invention, comprises one coating of urea on the surface of the central particle. Application of the coating occurs for a sufficient time to ensure an adequate amount of urea and adequate size of the resulting granule.

The size of central particles is 0.9 to 1.5 mm and preferably 1.0 to 1.2 mm. The final product granule size ranges from 2.50 to 3.60 mm and preferably 2.5 to 2.8 mm.

The final fertilizer product granule, containing a central particle, is typically comprised of 0.01 to 5% by wt. boric acid (or other boron compound), but preferably contains 0.01 to 1.0% by wt. boric acid (or other boron compound). In a further embodiment, the final product granule containing the central particle contains 0.01% to 5% by wt. potassium iodide (or other iodine compound), but preferably contains 0.01 to 1.0% by wt. potassium iodide (or other iodine compound).

2) The coating of urea in a second embodiment of the invention comprises two coating of urea. This first coating of urea is to build up the particle size for improved processing by such means as a high or even low flow fluid bed reactor to produce the fertilizer product granules. The size of core particles with the first coating of urea is 0.9 to 1.5 mm and preferably 1.0 to 1.2 mm. The core particles with first urea overcoat is an intermediate product, which may be stored or processed substantially immediately to a final fertilizer granular product.

In addition to improving processing, the urea over coat prevents exposure of processing personnel to boric acid dust during shipping and handling. The first urea over coat will also improve central particle storage and handling properties.

The central particles with first coating of urea are introduced to a urea granulation process, to be coated a second time with urea, to yield the fertilizer granular product. The fertilizer granules each contain a central particle near the center of the granule. The final product granule size ranges from 2.50 to 3.60 mm and preferably 2.5 to 2.8 mm.

The final fertilizer product granule, containing a central particle, is typically comprised of 0.01 to 5% by wt. boric acid (or other boron compound), but preferably contains 0.01 to 1.0% by wt. boric acid (or other boron compound). In a further embodiment, the final product granule containing the central particle contains 0.01% to 5% by wt. potassium iodide (or other iodine compound), but preferably contains 0.01 to 1.0% by wt. potassium iodide (or other iodine compound).

In further embodiments of the invention, during the above described process of making the central particle, other desirable additives may be added. Thus, in further embodiments, the central particle contains in addition to boron compounds and/or iodine compounds, such macro nutrients as potassium and phosphorus. In still further embodiments, the central particle additionally or alternatively contains macronutrients and one or more secondary nutrients such as calcium, magnesium, and sulfur. The central particle may additionally contain one or more micronutrients such as copper, iron, manganese, molybdenum, and zinc.

The embodiment of the central particle containing boric acid has advantages over the known technique of applying a surface coating of boric acid on urea granules, including the feature of central particle size being adjusted to vary the boric acid content. Further, the product of the present invention and can achieve much higher boric acid contents in the final product compared to coating boric acid on the surface of urea granules. In the present product, the central particle size can also be adjusted by granulating with inert materials if required.

The present invention is demonstrated with reference to the following examples, which are of an illustrative nature only and which are to be construed as non-limiting.

EXAMPLES

Examples of the Product

Containing Animal Nutrients

Animal Nutrient Example 1

Nutrient Composition (%)
1% Zn, 1% Fe, 0.3% B
Nutrient Source
Zinc Sulfate, Iron Sulfate, Boric Acid
Product Composition (%)
2.8% Zinc Sulfate, 5.0% Iron Sulfate, 1.7% Boric Acid, 90.5% Urea Animal Nutrient Example 2

Corresponds to Below Animal Nutrient Process Example 1

Nutrient Composition (%)
1.1% N, 2.3% P, 0.88% B, 1% Multi-Vitamin
Nutrient Source
MAP (monoammonium phosphate), Boric Acid, Multi-Vitamin Tablets
Product Composition (%)
10% MAP, 5% Boric Acid, 1% Multi-Vitamin Animal Nutrient Example 3

Corresponds to Below Animal Nutrient Process Example 2

Nutrient Composition (%)
1.1% N, 2.3% P, 0.18% B, 1% Multi-Vitamin, 0.76% I, 0.35% Zn, 0.2% Fe
Nutrient Source
MAP, Boric Acid, Multi-Vitamin Tablets, Potassium Iodide, Zinc Sulfate, Iron
Sulfate
Product Composition (%)
10% MAP, 1% Boric Acid, 1% Multi-Vitamin, 1% Potassium Iodide, 1% Zinc Sulfate, 1% Iron Sulfate
Ammonia Volatilization Tests Of Products Ammonia volatilization studies have been conducted on urea fertilizer granules containing central particles comprised of boric acid and other materials. In addition to boric acid, other compounds were tested for inhibition of ammonia volatilization including copper sulfate, zinc sulfate, single superphosphate, mono-ammonium phosphate, triple superphosphate, ammonium bisulfate, and citric acid. The central core of product samples varied in size, however, the final product size was within a standard range of product sizes between 2.8 mm and 3.3 mm.

Product samples in the form of micro prills contained urea and were 0.5 to 0.9 mm in size. The amount of boric acid in the micro prills was determined based on the desired final product concentration.

The amount of urea was consistently the same for products containing a central particle and products having additives to the granulation melt.

Below Table 1 sets forth a description of each product tested. Other boron sources than boric acid were also tested including anhydrous sodium tetraborate (Dehybor®—trade name) and Sodium tetraborate 10 mole (Borax®—trade name). Polyacrylamide and corn starch were also tested as additives

TABLE 1

Products Samples Tested for Inhibition of Ammonia Volatilization

| Product Label | Product Sample Description |
| --- | --- |
| VOL-1 | 1% Boric Acid Central Particle (Corn Syrup binder) over coated w/ Urea |
| VOL-2 | 5% Granular Boron Central Particle over coated w/ Urea |
| VOL-3 | 1% Copper Sulfate Central Particle (Calcium Ligno-sulfonate binder) over coated w/ Urea |
| VOL-4 | 1% Dehybor Central Particle (Calcium Ligno-sulfonate binder) over coated w/ Urea |
| VOL-5 | 1% Zinc Sulfate Central Particle (Calcium Ligno-sulfonate binder) over coated w/ Urea |
| VOL-6 | 10% Single Superphosphate Central Particle over coated w/ Urea |
| VOL-7 | 10% MAP (Mono Ammonium Phosphate) Central Particle over coated w/ Urea |
| VOL-8 | 25% MAP Central Particle over coated w/ Urea |
| VOL-9 | 50% MAP Central Particle over coated w/ Urea |
| VOL-10 | 1% Boric Acid & 1% Polyacrylamide Central Particle (Corn Syrup binder) over coated w/ Urea |
| VOL-11 | 5% Boric Acid & 1% Polyacrylamide Central Particle (Corn Syrup binder) over coated w/ Urea |
| VOL-12 | 10% Single Superphosphate Central Particle (Dehydrated) over coated w/ Urea |
| VOL-13 | 10% Triple Superphosphate Central Particle (Dehydrated) over coated w/ Urea |
| VOL-14 | 5% Boric Acid Central Particle (Corn Syrup binder) over coated w/ Urea |
| VOL-15 | Urea Microprills over coated w/ 3% Boric Acid in Urea Melt |
| VOL-16 | Urea Microprills over coated w/ 3% Ammonium Bisulfate in Urea Melt |
| VOL-17 | Urea Microprills over coated w/ 3% Citric Acid in Urea Melt |
| VOL-18 | Urea Microprills over coated w/ 3% Boric Acid & 1% Corn Starch in Urea Melt |
| VOL-19 | 1% Borax Central Particle (Corn Syrup) over coated w/ Urea |
| VOL-20 | 1% Borax Central Particle (Calcium Ligno-sulfonate binder) over coated w/ Urea |
| VOL-21 | 0.5% Boric Acid Central Particle (Corn Syrup binder) over coated w/ Urea |
| VOL-22 | 1% Boric Acid Central Particle (Calcium Ligno-sulfonate binder) over coated w/ Urea |
| VOL-23 | 3% Boric Acid Central Particle (Corn Syrup binder) over coated w/ Urea |
| VOL-24 | Urea Microprills over coated w/ 1% Boric Acid in Urea Melt |
| VOL-25 | Urea Microprills over coated w/ 1% Boric Acid & Corn Syrup in Urea Melt |
| VOL-26 | Urea Microprills over coated w/ 1% Borax in Urea Melt |
| VOL-27 | Urea Microprills over coated w/ 1% Borax & Corn Syrup in Urea Melt |
| VOL-28 | Urea Microprills over coated w/ 0.3% Copper Sulfate & 0.7% Borax in Urea Melt |
| VOL-29 | Urea Microprills over coated w/ 1% Copper Sulfate & 2% Borax in Urea Melt |

TABLE 1-continued

Products Samples Tested for Inhibition of Ammonia Volatilization

| Product Label | Product Sample Description |
|---|---|
| VOL-30 | Urea Microprills over coated w/ 1% Corn Syrup in Urea Melt |
| VOL-31 | Boric Acid Central Particle @ 0.3% Boron over coated w/urea |
| VOL-32 | Boric Acid Central Particle @ 0.6% Boron over coated w/urea |
| VOL-33 | Borax Central Particle @ 0.3% Boron over coated w/urea |
| VOL-34 | Borax Central Particle @ 0.6% Boron over coated w/urea |
| VOL-35 | Urea Microprills over coated w/ Boric Acid @ 0.6% Boron in Urea Melt |
| VOL-36 | Urea Microprills over coated w/ Borax @ 0.6% Boron in Urea Melt |
| VOL-37 | Urea Microprills over coated w/ Boric Acid @ 0.3% Boron & Potassium Iodide @ 0.3% Iodine in Urea Melt |

Ammonia Volatilization Test Method

Nitrogen lost, as ammonia, after soil application occurs over a long time period. The present volatilization test was designed to simulate and quantify processes in the soil. The volatilization test apparatus and procedure utilized to evaluate the test product samples described in above Table 1 is summarized as follows.

Procedure for Measurement of Ammonia

The test was designed to determine the volatility of a fertilizer product when applied to the surface of the soil. The baseline, standard that used was one gram of urea. Each sample was placed in a sample flask which contained a pre-weighed amount of soil and water. The same source of soil was used in all testing. Humidified air was then passed over the sample to carry any ammonia which had volatilized by the enzymes in the soil, to a receiving flask. The receiving flask contained sulfuric acid which captured the ammonia. The receiving flask was then titrated to determine the amount of ammonia volatilized from each sample.

Testing Solutions:

Mixed Methyl Red—Methylene Blue Indicator (150 mL):
Dissolve 0.2 g of methyl red in 100 mL of ethyl alcohol (70-95%). Dissolve 0.1 g methylene blue in 50 mL of ethyl alcohol (70-95%). Mix together.
Indicator was good for 30 days.

Testing Apparatus:

Manifold:
a. A manifold was constructed of ½ inch cpvc (chlorinated polyvinyl chloride).
b. The manifold has 22 ports with a needle valve for air flow adjustment.
c. The tubing from the manifold to the sample flask was connected to a 1/16 inch hose barb on the needle valve.

2. Air Supply:
a. The air was supplied by an air compressor with a regulator to control the pressure to the manifold.
b. The air goes through a rotameter with a control knob to adjust the flow to the manifold (A minimum of 70 volumes of the head space is in each sample flask during each sampling interval, often much higher. Head space refers to the air volume above the soil.).
c. The air from the rotameter goes through a bubbler containing 25% sulfuric acid solution. After the sulfuric acid bubbler is a knock out chamber to prevent any sulfuric acid mist from going further.
d. The air then goes to a water bubbler to hydrate the air before going through another knock out chamber before entering the manifold.

3. Sample Flask
a. The sample flask is a 250 mL Erlenmeyer flask. The tubing from the manifold is connected to the flask by a barb fitting in a rubber stopper.
b. Each sample flask contained 48 grams of soil (dried and sieved through a 12 mesh screen), 12 grams of water, and the equivalent of one gram of urea. The materials were added to the flasks in the order list to ensure that the sample was added to moist soil (20-25%).

4. Receiving Flask
a. The receiving flask is a 125 mL Erlenmeyer flask. Tubing from the stopper on the sample flask is connected to a glass sparger passing through a stopper to the receiving flask.
b. Each receiving flask contains 50 mL of 0.5N Sulfuric Acid.
c. The tip of the glass sparger is below the level of the acid to allow the air to bubble through the acid and capture any ammonia present.
d. The receiving flask is removed and replaced with flask containing fresh solution at the intervals of 3, 7 and 10 days.

5. Measurement of Ammonia
a. The contents of each receiving flask removed at the intervals of 3, 7 and 10 days were tested for ammonia according to the above described Procedure for Measurement of Ammonia. The first ten days are most critical and are sufficient to determine reliable comparative results.
b. Measurements for each of the product samples are presented in the below Tables and displayed in the attached Figures.

Ammonia Volatilization Test Results for Products in Table 2

Product samples tested in this test series included: 1% boric acid (VOL 1), 5% granular boron (VOL 2), 1% copper sulfate (VOL 3), 1% Dehybor (VOL 4), and 1% zinc sulfate (VOL 5). All these products were produced as central particles containing the ammonia inhibiting agent and over-coated with urea. For comparison, a urea sample was employed without additive and a commercially proven (Bi-En, Stabl-U™) product were also included in the test series. The urea employed in producing the product samples of all test series was the same urea used for the standard urea (solely urea). Bi-En, Stabl-U™ is a product comprising a calcium cynanamide particle coated with urea (described in U.S. Pat. No. 6,576,035). The data shows that of this series, 1% boric acid (VOL 1) showed the lowest amount of ammonia released and thus performed the best.

Note that the Bi-En, Stabl-U™ and the Agrotain® of the Table 3 series below were stand alone products used for comparative purposes. Agrotain® is the current industry standard.

Figure 1:
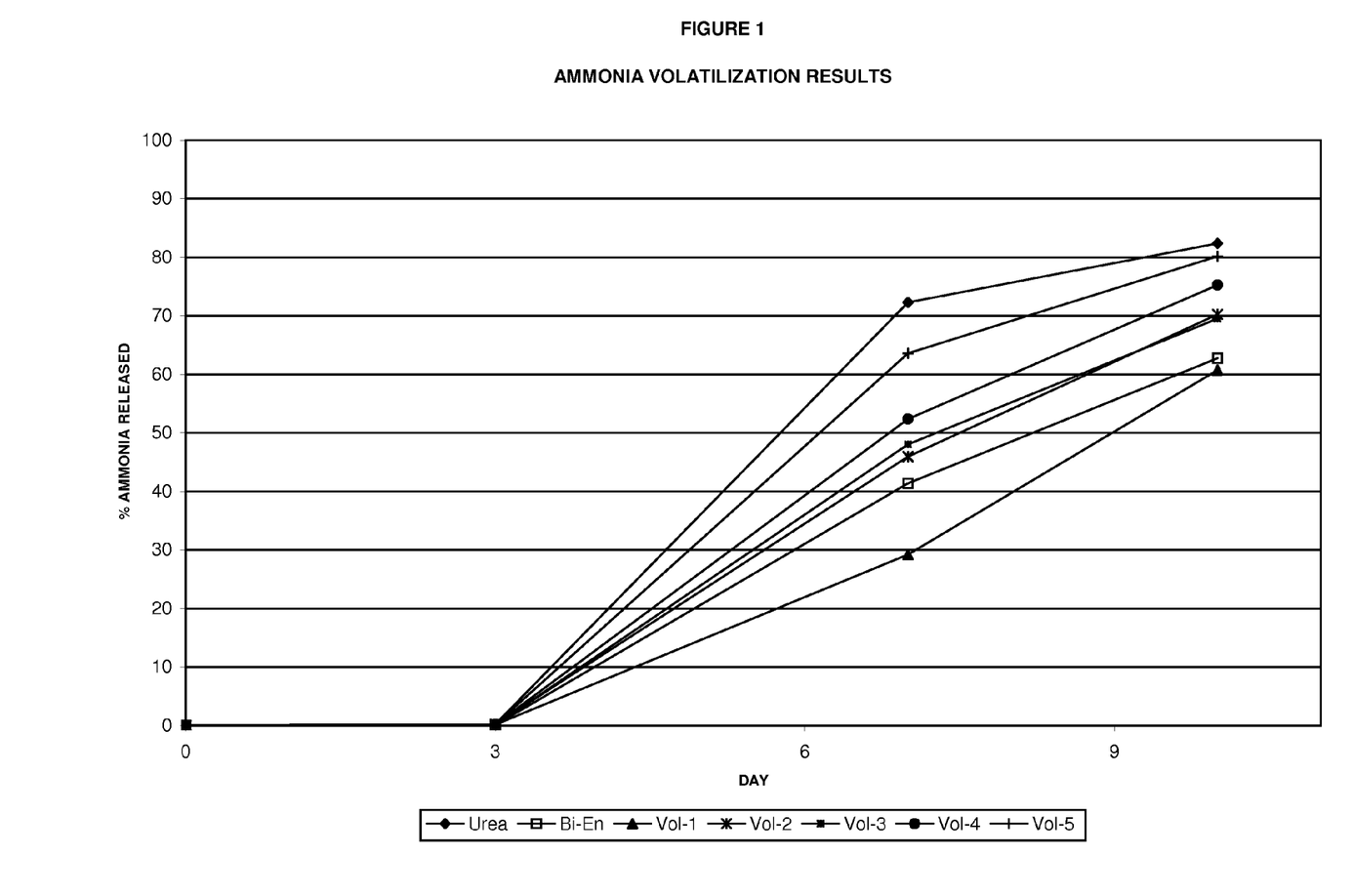
FIG. 1 shows the cumulative nitrogen loss for selected product samples over a 10 day period.

Table 2 shows the test data of ammonia volatilization from the product samples of this series. FIG. 1 illustrates the ammonia volatilization results in Table 2 by showing cumulative nitrogen loss (i.e. percent ammonia released) for the sample products over a 10 day period. The "percent ammonia released" is the proportion (percent) of total starting nitrogen available.

TABLE 2

Ammonia Volatilization Test Results (% Ammonia Released)

| Day | Product Sample | | | | | | |
|---|---|---|---|---|---|---|---|
| | Urea | Bi-En | Vol-1 | Vol-2 | Vol-3 | Vol-4 | Vol-5 |
| 0 | 0 | 0 | 0 | 0 | 0 | 0 | 0 |
| 3 | 0.23 | 0.07 | 0.15 | 0.17 | 0.09 | 0.20 | 0.21 |
| 7 | 72.29 | 41.38 | 29.21 | 45.95 | 48.01 | 52.36 | 63.57 |
| 10 | 82.37 | 62.75 | 60.72 | 70.24 | 69.51 | 75.27 | 80.15 |

Ammonia Volatilization Test Results for Products in Table 3

Product samples tested in this test series included: 1% boric acid (VOL 1), 10% single sulfate (VOL 6), 10% MAP (VOL 7), 25% MAP (VOL 8), 50% MAP (VOL 9), 1% boric acid with 1% polyacrylamide (VOL 10), and 5% boric acid with 1% polyacrylamide (VOL 11). For comparison purposes a sample containing urea and a commercial available ammonia inhibitor (Agrotain®) was included. This test showed that 1% boric acid (VOL 1) performed nearly as well as Agrotain®. All these products were produced as central particles containing the ammonia inhibiting agent over-coated with urea.

Figure 2:
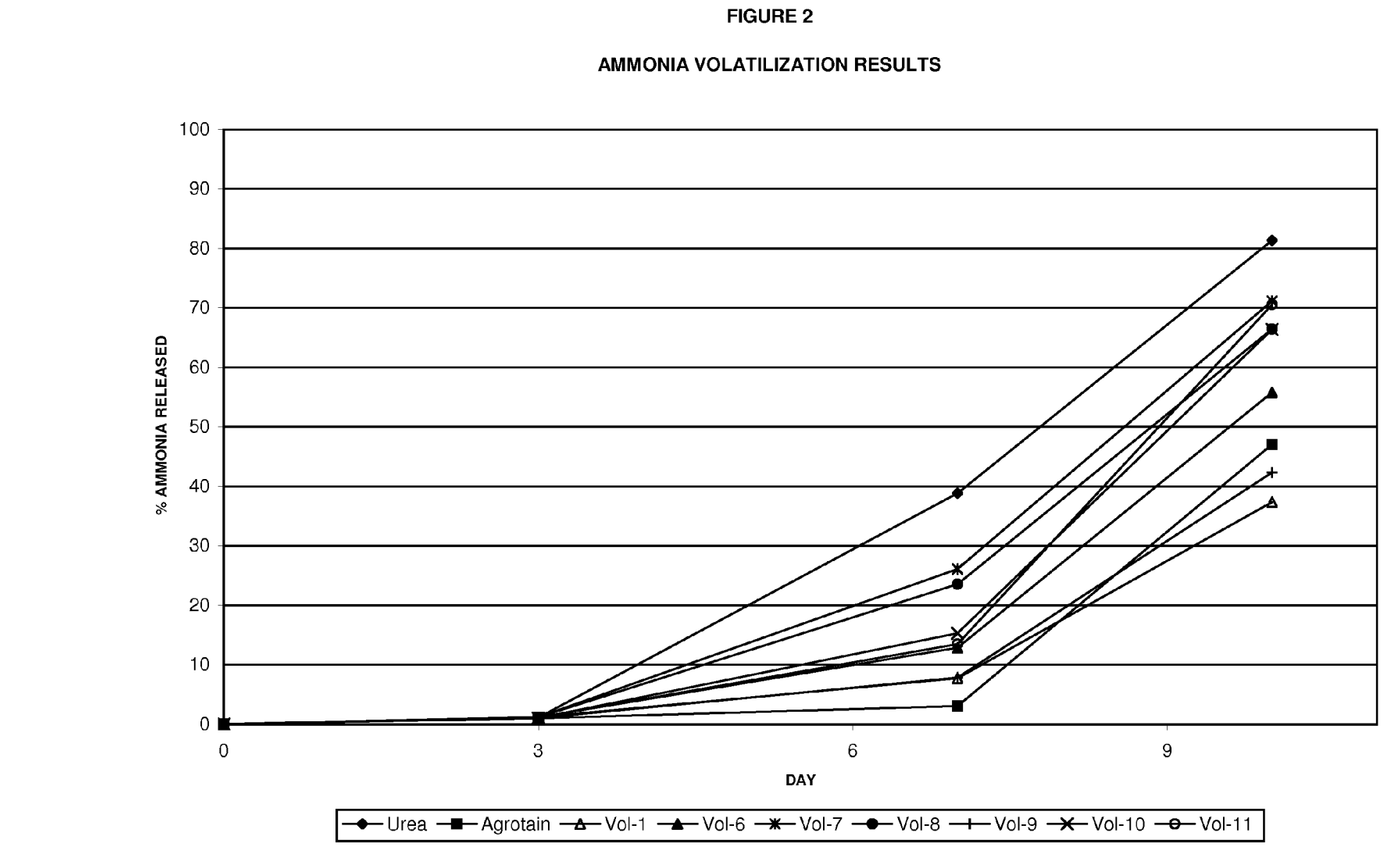
FIG. 2 shows the cumulative nitrogen loss (volatilization test results) for selected product samples set forth in Table 3.

Table 3 shows the test data of ammonia volatilization from the product samples of this series. FIG. 2 illustrates the ammonia volatilization results in Table 3 by showing cumulative nitrogen loss (i.e. percent ammonia released) for the sample products over a 10 day period.

TABLE 3

Ammonia Volatilization Test Results (% Ammonia Released)

| Day | Sample | | | | | | | | |
|---|---|---|---|---|---|---|---|---|---|
| | Urea | Agrotain | Vol-1 | Vol-6 | Vol-7 | Vol-8 | Vol-9 | Vol-10 | Vol-11 |
| 0 | 0 | 0 | 0 | 0 | 0 | 0 | 0 | 0 | 0 |
| 3 | 1.09 | 1.00 | 1.17 | 1.18 | 1.19 | 1.17 | 1.02 | 1.03 | 1.12 |
| 7 | 38.83 | 3.03 | 7.72 | 12.84 | 26.08 | 23.54 | 7.84 | 15.30 | 13.48 |
| 10 | 81.33 | 47.03 | 37.33 | 55.78 | 71.14 | 66.43 | 42.31 | 66.36 | 70.52 |

Ammonia Volatilization Test Results for Products in Table 4

Product samples tested in this test series included: 10% single sulfate (VOL 12), 10% triple super phosphate (VOL 13), 5% boric acid (VOL 14) where these were produced with a central particle over-coated with urea. An alternate method was also evaluated where the potential ammonia inhibiting agent was added directly to the melt. The following products were prepared in this manner; 3% boric acid (VOL 15), 3% ammonium bisulfate (VOL 16), 3% citric acid (VOL 17), 3% boric acid with 1% corn starch (VOL 18). MAP was also included for comparison. The Agrotain® sample was urea coated with the commercial product, Agrotain®.

Figure 3:
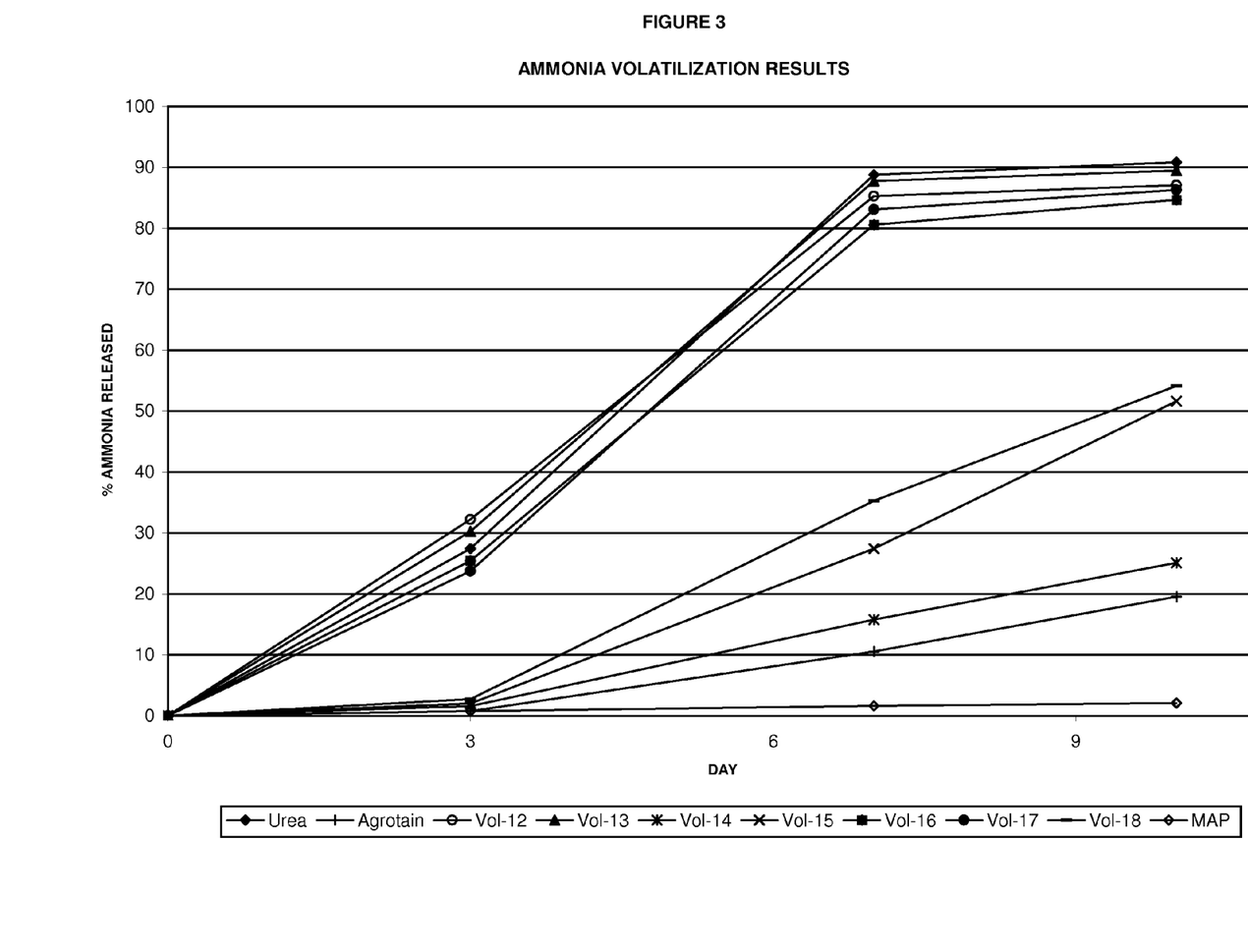
FIG. 3 shows the cumulative nitrogen loss (volatilization test results) for selected product samples set forth in Table 4.

Table 4 shows the test data of ammonia volatilization from the product samples of this series. FIG. 3 illustrates the ammonia volatilization results in Table 4 by showing cumulative nitrogen loss (i.e. percent ammonia released) for the sample products over a 10 day period.

TABLE 4

Ammonia Volatilization Test Results (% Ammonia Released)

| Day | Urea | Agrotain | Vol-12 | Vol-13 | Vol-14 | Vol-15 | Vol-16 | Vol-17 | Vol-18 | MAP |
|---|---|---|---|---|---|---|---|---|---|---|
| 0 | 0 | 0 | 0 | 0 | 0 | 0 | 0 | 0 | 0 | 0 |
| 3 | 27.41 | 0.75 | 32.21 | 30.26 | 1.58 | 2.01 | 25.41 | 23.74 | 2.74 | 0.74 |
| 7 | 88.77 | 10.55 | 85.26 | 87.75 | 15.78 | 27.42 | 80.56 | 83.07 | 35.27 | 1.61 |
| 10 | 90.81 | 19.52 | 87.05 | 89.48 | 25.08 | 51.62 | 84.67 | 86.28 | 54.11 | 2.09 |

Ammonia Volatilization Test Results for Products in Table 5

Product samples tested in this test series included: (VOL-14) 5% boric acid with corn syrup binder over coated with urea, (VOL-31) Boric acid central particle with 0.3% boron over coated with urea, (VOL-33) Borax central particle with 0.3% boron over coated with urea, (VOL-34) Borax central particle with 0.6% boron over coated with urea, and (VOL-37) urea micro prills over coated with boric acid (0.3% boron) and potassium iodide (0.3% iodine) in urea melt.

The MAP (monoammonium phosphate) sample, containing no urea, was used for comparison with the other sample products. In sample products VOL 7, 8 and 9, MAP was employed in the sample product central particle and measured for ammonia volatilization inhibition.

Figure 4:
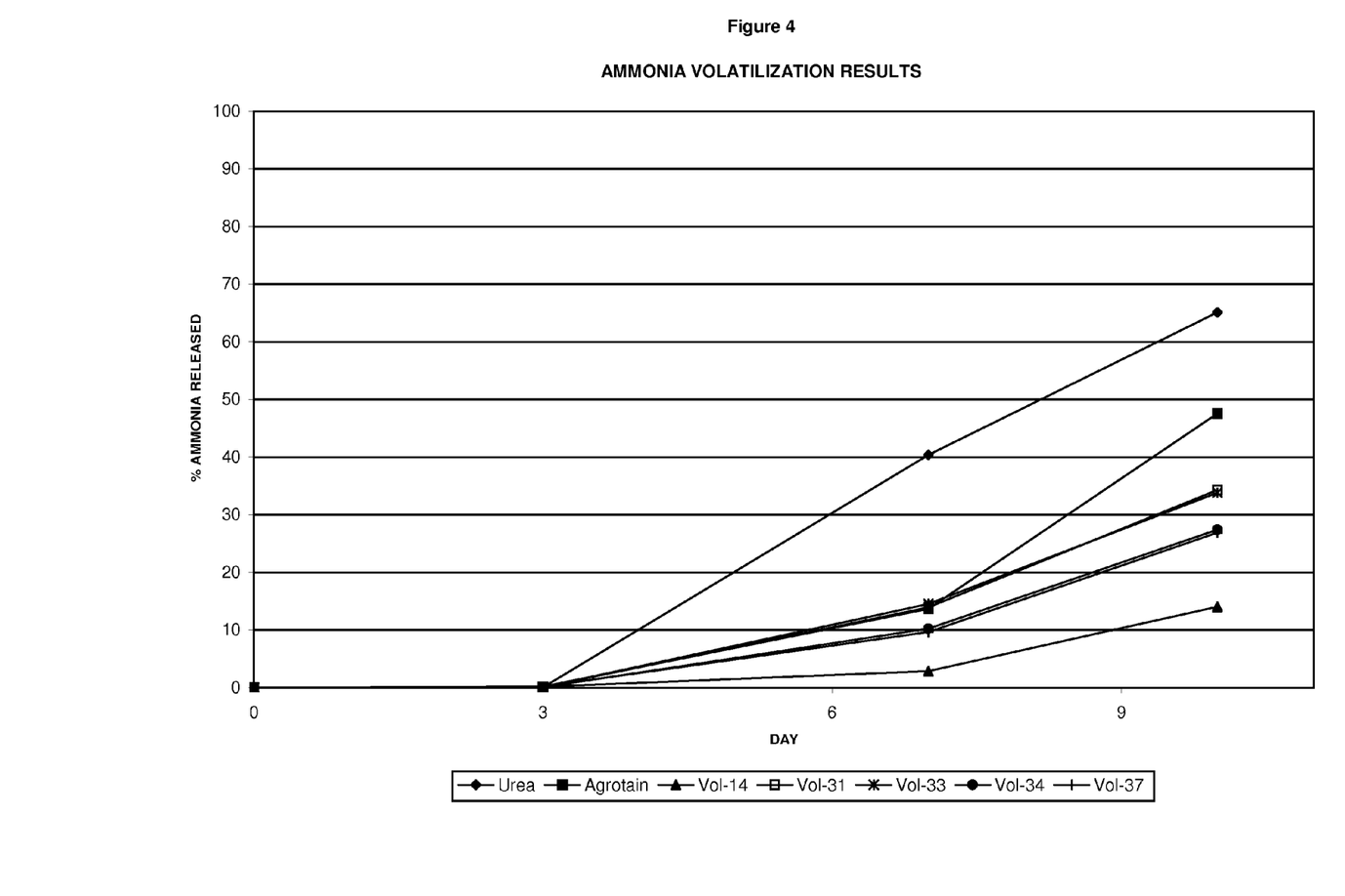
FIG. 4 shows the cumulative nitrogen loss (volatilization test results) for selected product samples set forth in Table 5.

Table 5 shows the test data of ammonia volatilization from the product samples of this series. FIG. 4 illustrates the ammonia volatilization results in Table 5 by showing cumulative nitrogen loss (i.e. percent ammonia released) for the sample products over a 10 day period.

TABLE 5

Ammonia Volatilization Test Results (% Ammonia Released)

| Day | Urea | Agrotain | Vol-14 | Vol-31 | Vol-33 | Vol-34 | Vol-37 |
|---|---|---|---|---|---|---|---|
| 0 | 0 | 0 | 0 | 0 | 0 | 0 | 0 |
| 3 | 0.05 | 0.19 | 0.15 | 0.08 | 0.06 | 0.09 | 0.19 |
| 7 | 40.35 | 13.66 | 2.86 | 13.91 | 14.50 | 10.23 | 9.62 |
| 10 | 65.11 | 47.55 | 14.04 | 34.29 | 33.82 | 27.41 | 26.88 |

The following Table 6 shows the results of measuring the total nitrogen for each product sample. Total nitrogen was measured to determine the total amount of ammonia available at the start of testing.

TABLE 6

Nitrogen Analysis

| Sample No. | Product Sample Name | % Nitrogen | Average % Nitrogen |
|---|---|---|---|
| | Agrotain ® 1 | 45.974 | 45.814 |
| | Agrotain ® 2 | 45.654 | |
| | Bi-En, Stabl-U ™ 1 | 44.070 | 43.482 |
| | Bi-En, Stabl-U ™ 2 | 42.894 | |
| VOL 1 | 1% Boric Acid Seed (Corn Syrup) o.c. w/ Urea 1 | 45.313 | 45.344 |
| VOL 1 | 1% Boric Acid Seed (Corn Syrup) o.c. w/ Urea 2 | 45.374 | |
| VOL 2 | 5% Granular Boron Seed o.c. w/ Urea 1 | 43.366 | 43.169 |
| VOL 2 | 5% Granular Boron Seed o.c. w/ Urea 2 | 42.972 | |
| VOL 3 | 1% Copper Sulfate Seed (Ligno) o.c. w/ Urea 1 | 45.595 | 45.542 |
| VOL 3 | 1% Copper Sulfate Seed (Ligno) o.c. w/ Urea 2 | 45.488 | |
| VOL 4 | 1% Dehybor Seed (Ligno) o.c. w/ Urea 1 | 46.148 | 46.085 |
| VOL 4 | 1% Dehybor Seed (Ligno) o.c. w/ Urea 2 | 46.022 | |
| VOL 5 | 1% Zinc Sulfate Seed (Ligno) o.c. w/ Urea 1 | 42.513 | 43.689 |
| VOL 5 | 1% Zinc Sulfate Seed (Ligno) o.c. w/ Urea 2 | 44.865 | |
| VOL 6 | 10% Single Superphosphate Seed o.c. w/ Urea 1 | 40.827 | 42.312 |
| VOL 6 | 10% Single Superphosphate Seed o.c. w/ Urea 2 | 43.797 | |
| VOL 7 | 10% MAP Seed o.c.w/ Urea 1 | 37.985 | 37.982 |
| VOL 7 | 10% MAP Seed o.c.w/ Urea 2 | 37.979 | |
| VOL 8 | 25% MAP Seed o.c.w/ Urea 1 | 32.304 | 32.691 |
| VOL 8 | 25% MAP Seed o.c.w/ Urea 2 | 33.078 | |
| VOL 9 | 50% MAP Seed o.c. w/ Urea 1 | 24.662 | 24.854 |
| VOL 9 | 50% MAP Seed o.c. w/ Urea 2 | 25.046 | |
| VOL 10 | 1% Boric Acid & 1% Polyacrylamide Seed (Corn Syrup) o.c. w/ Urea 1 | 45.845 | 45.847 |
| VOL 10 | 1% Boric Acid & 1% Polyacrylamide Seed (Corn Syrup) o.c. w/ Urea 2 | 45.848 | |
| VOL 11 | 5% Boric Acid & 1% Polyacrylamide Seed (Corn Syrup) o.c. w/ Urea 1 | 45.336 | 45.318 |
| VOL 11 | 5% Boric Acid & 1% Polyacrylamide Seed (Corn Syrup) o.c. w/ Urea 2 | 45.299 | |
| NP 1 | 10% MAP, 5% Boric Acid, 1% Vitamin Seed o.c. w/ Urea 1 | 39.037 | 39.591 |
| NP 1 | 10% MAP, 5% Boric Acid, 1% Vitamin Seed o.c. w/ Urea) 2 | 40.144 | |
| NP 2 | 10% MAP, 1% Boric Acid, 1% Vitamin, 1% Potassium Iodide, 1% Zinc Sulfate, 1% Iron Sulfate Seed o.c. w/ Urea 1 | 42.174 | 41.955 |
| NP 2 | 10% MAP, 1% Boric Acid, 1% Vitamin, 1% Potassium Iodide, 1% Zinc Sulfate, 1% Iron Sulfate Seed o.c. w/ Urea 2 | 41.736 | |
| VOL 12 | 10% Single Superphosphate Seed (Dehydrated) o.c. w/ Urea 1 | 43.089 | 42.839 |
| VOL 12 | 10% Single Superphosphate Seed (Dehydrated) o.c. w/ Urea 2 | 42.589 | |
| VOL 13 | 10% Triple Superphosphate Seed (Dehydrated) o.c. w/ Urea 1 | 40.855 | 41.518 |

TABLE 6-continued

Nitrogen Analysis

| Sample No. | Product Sample Name | % Nitrogen | Average % Nitrogen |
|---|---|---|---|
| VOL 13 | 10% Triple Superphosphate Seed (Dehydrated) o.c. w/ Urea 2 | 42.181 | |
| VOL 14 | 5% Boric Acid Seed (Corn Syrup) o.c. w/ Urea 1 | 44.854 | 44.850 |
| VOL 14 | 5% Boric Acid Seed (Corn Syrup) o.c. w/ Urea 2 | 44.846 | |
| VOL 15 | Urea Microprills o.c. w/ 3% Boric Acid in Urea Melt 1 | 45.068 | 45.121 |
| VOL 15 | Urea Microprills o.c. w/ 3% Boric Acid in Urea Melt 2 | 45.173 | |
| VOL 16 | Urea Microprills o.c. w/ 3% Ammonium Bisulfate in Urea Melt 1 | 44.495 | 44.675 |
| VOL 16 | Urea Microprills o.c. w/ 3% Ammonium Bisulfate in Urea Melt 2 | 44.855 | |
| VOL 17 | Urea Microprills o.c. w/ 3% Citric Acid in Urea Melt 1 | 45.361 | 45.283 |
| VOL 17 | Urea Microprills o.c. w/ 3% Citric Acid in Urea Melt 2 | 45.204 | |
| VOL 18 | Urea Microprills o.c. w/ 3% Boric Acid & 1% Corn Startch in Urea Melt 1 | 44.891 | 44.937 |
| VOL 18 | Urea Microprills o.c. w/ 3% Boric Acid & 1% Corn Startch in Urea Melt) 2 | 44.982 | |
| VOL 19 | 1% Borax Seed (Corn Syrup) o.c.w/ Urea 1 | 45.702 | 45.727 |
| VOL 19 | 1% Borax Seed (Corn Syrup) o.c.w/ Urea 2 | 45.751 | |
| VOL 20 | 1% Borax Seed (Ligno) o.c.w/ Urea 1 | 45.589 | 45.527 |
| VOL 20 | 1% Borax Seed (Lingo) o.c.w/ Urea 2 | 45.465 | |
| VOL 21 | 0.5% Boric Acid Seed (Corn Syrup) o.c.w/ Urea 1 | 44.401 | 44.324 |
| VOL 21 | 0.5% Boric Acid Seed (Corn Syrup) o.c.w/ Urea 2 | 44.247 | |
| VOL 22 | 1% Boric Acid Seed (Lingo) o.c. w/ Urea 1 | 44.085 | 44.344 |
| VOL 22 | 1% Boric Acid Seed (Lingo) o.c. w/ Urea 2 | 44.603 | |
| VOL 23 | 3% Boric Acid Seed (Corn Syrup) o.c. w/ Urea 1 | 43.971 | 43.815 |
| VOL 23 | 3% Boric Acid Seed (Corn Syrup) o.c. w/ Urea 2 | 43.659 | |
| VOL 24 | Urea Microprills o.c. w/ 1% Boric Acid in Urea Melt 1 | 45.232 | 45.452 |
| VOL 24 | Urea Microprills o.c. w/ 1% Boric Acid in Urea Melt 2 | 45.671 | |
| VOL 25 | Urea Microprills o.c.w/ 1% Boric Acid & Corn Syrup in Urea Melt 1 | 44.803 | 44.557 |
| VOL 25 | Urea Microprills o.c.w/ 1% Boric Acid & Corn Syrup in Urea Melt 2 | 44.311 | |
| VOL 26 | Urea Microprills o.c. w/ 1% Borax in Urea Melt 1 | 44.545 | 44.607 |
| VOL 26 | Urea Microprills o.c. w/ 1% Borax in Urea Melt 2 | 44.668 | |
| VOL 27 | Urea Microprills o.c. w/ 1% Borax & Corn Syrup in Urea Melt 1 | 44.603 | 44.706 |
| VOL 27 | Urea Microprills o.c. w/ 1% Borax & Corn Syrup in Urea Melt 2 | 44.809 | |
| VOL 28 | Urea Microprills o.c. w/ 0.3% Copper Sulfate & 0.7% Borax in Urea Melt 1 | 45.125 | 45.219 |
| VOL 28 | Urea Microprills o.c. w/ 0.3% Copper Sulfate & 0.7% Borax in Urea Melt 2 | 45.312 | |
| VOL 29 | Urea Microprills o.c. w/ 1% Copper Sulfate & 2% Borax in Urea Melt 1 | 44.787 | 44.803 |
| VOL 29 | Urea Microprills o.c. w/ 1% Copper Sulfate & 2% Borax in Urea Melt 2 | 44.818 | |
| VOL 30 | Urea Microprills o.c. w/ 1% Corn Syrup in Urea Melt 1 | 45.020 | 45.202 |
| VOL 30 | Urea Microprills o.c. w/ 1% Corn Syrup in Urea Melt 2 | 45.384 | |
| VOL 31 | Boriic Acid Seed at 0.3% Boron o.c. w/ Urea | 44.815 | 44.977 |
| VOL 31 | Boric Acid Seed at 0.3% Boron o.c. w/ Urea | 45.138 | |
| VOL 32 | Boric Acid Seed at 0.6% Boron o.c. w/ Urea | 40.283 | 40.306 |
| VOL 32 | Boric Acid Seed at 0.6% Boron o.c. w/ Urea | 40.328 | |
| VOL 33 | Borax Seed at 0.3% Boron o.c. w/ Urea | 43.979 | 44.570 |
| VOL 33 | Borax Seed at 0.3% Boron o.c. w/ Urea | 45.160 | |
| VOL 34 | Borax Seed at 0.6% Boron o.c. w/ Urea | 43.725 | 43.973 |
| VOL 34 | Borax Seed at 0.6% Boron o.c. w/ Urea | 44.221 | |
| VOL 35 | Urea Microprills o.c. w/ Boric Acid at 0.6% Boron in Urea Melt | 45.024 | 44.939 |
| VOL 35 | Urea Microprills o.c. w/ Boric Acid at 0.6% Boron in Urea Melt | 44.854 | |
| VOL 36 | Urea Microprills o.c. w/ Borax at 0.6% Boron in Urea Melt | 43.986 | 44.090 |
| VOL 36 | Urea Microprills o.c. w/ Borax at 0.6% Boron in Urea Melt | 44.193 | |
| VOL 37 | Urea Microprills o.c. w/ Boric Acid at 0.3% Boron & Potassium Iodide at 0.3% Iodide in Urea Melt | 44.850 | 44.933 |
| VOL 37 | Urea Microprills o.c. w/ Boric Acid at 0.3% Boron & Potassium Iodide at 0.3% Iodide in Urea Melt | 45.015 | |

Process Examples

Example 1

Process for Producing Sample Product Vol-14

Sample fertilizer granules containing central particles of 5% boric acid were prepared by first granulating the central particles. Powdered boric acid was granulated with corn syrup as the binder using a pan granulator. Binder content in the final central particles was 7.0% (dry basis). Screening the central particles to a preferred central particle size of 1.0 mm to 1.2 mm.

Industrial grade urea was melted and sprayed to overcoat the central particles. The urea over-coating drum was 20" in diameter, 5" wide, 2" deep, with forty-1" lifting flights mounted 1½" apart inside the drum to assist in forming a falling curtain during melt spray granulation. The stainless steel granulation drum was mounted on a variable speed base. Approximately 1 pound of central particle material was placed inside the drum to form a falling curtain. The drum speed during granulation was 35-40 rpm.

Industrial grade urea granules were melted in a stainless steel tube melter. The steam pressure on the tube melter was 55-60 psig. The molten urea was transferred to a stainless steel holding tank. The molten urea was applied to the central particles in the drum, using a steam jacketed positive displacement 30:1 hydraulic pump. A Spraying Systems 650025 hydraulic nozzle and 200 mesh stainless steel strainer was used to spray the molten urea. Spraying pressure was 400 to 600 psig. The coated particles were continuously recycled into the coating drum until the granules reached a desired particle 2.80 to 3.30 mm. The material was removed from the granulation drum and allowed to cool before the samples were bagged.

Example 2

Process for Producing Sample Product Vol-24

Another process embodiment for adding boric acid to urea was to dissolve it directly into molten urea prior to granulation. A urea product consisting of 1.0% boric acid was prepared by dissolving 78 grams of boric acid in 10.85 lbs of urea. The mixture was held at 280 to 290 F.

The granulation drum was 20" in diameter, 5" wide, 2" deep, with forty-1" lifting flights mounted 1½" apart inside the drum to assist in forming a falling curtain during melt spray granulation. The stainless steel granulation drum was mounted on a variable speed base. Approximately 1 pound of urea central particle material was placed inside the drum to form a falling curtain. The drum speed during granulation was 35-40 rpm.

Industrial grade urea was melted in a stainless steel tube melter. The steam pressure on the tube melter was 55-60 psig. The molten urea was transferred to a stainless steel holding tank where boric acid powder was added. The molten urea boric acid mixture was then granulated in the rotary granulation drum. A steam jacketed positive displacement 30:1 hydraulic pump was utilized to spray the mixture. A Spraying Systems 650025 hydraulic nozzle and 200 mesh stainless steel strainer was used to spray the molten mixture. Spraying pressure was 200-300 psig. The granules were continuously recycled into the granulation drum until the granules reached a desired particle size of 3.3 mm. The material was removed from the granulation drum and allowed to cool before the samples were bagged.

Example 3

Process for Producing Sample Product Vol-37

Another process embodiment for adding boric acid and iodine to urea was to dissolve it directly into molten urea prior to granulation. A urea product consisting of 0.3% boron and 0.3% iodine was prepared by dissolving 80 grams of boric acid and 18 grams of potassium iodide in 9.94 lbs of urea. The mixture was held at 280 to 290 F. Granules were then granulated as described in example 3.

Process Examples for Anti-Microbial Agent Embodiments

The following are non-exclusive examples of the anti-microbial agent embodiment of the present invention for each of the above described classes of anti-microbial agents:

Disinfectant Examples

Disinfectant Example 1

5 grams of sodium hypochlorite or calcium hypochlorite granules (0.5 mm) are over-coated with 995 grams of molten urea to form a 2.8 mm finish particle. Urea is melted and hydraulically sprayed in either a fluid-bed or drum coating apparatus. The final product concentration is 0.50% by wt. sodium or calcium hypochlorite.

Disinfectant Example 2

5 grams of potassium persulfate granules (0.5 mm) are over-coated with 995 grams of molten urea to form a 2.8 mm finish particle. Urea is melted and hydraulically sprayed in either a fluid-bed or drum coating apparatus. The final product concentration is 0.50% by wt. potassium persulfate.

Cationic Surfactant Example

A surfactant such as benzalkonium chloride is added to the surface of urea granules. The coating percentage is 0.2% by weight. 2 grams of benzalkonium chloride are added to 998 grams of urea by spraying a solution of benzalkonium chloride. The urea granules are then dried in a fluid bed or drying drum.

Weak Acid Example 10 grams of benzoic acid powder are applied to 985 grams of urea granules. 5 grams of coating additive such as mineral oil is applied prior to the benzoic acid powder addition to adhere the powder to the urea surface. Resulting product contains 1% by weight benzoic acid.

Sulfonamide Example 5 grams of sulfadiazine powder are applied to 990 grams of urea granules. 5 grams of coating additive such as mineral oil is applied prior to the sulfadiazine powder addition to adhere the powder to the urea surface. Resulting product contains 0.5% by weight sulfadiazine.

Process Examples for Producing Product Having Central Particle Further Comprising Animal Nutrients

Animal Nutrient Process Example 1

Fertilizer granules were produced comprised of central volatilization inhibitor particles containing (by wt.) 10% mono-ammonium phosphate (MAP), 5% boric acid and 1% vitamin-mineral composition. The central volatilization inhibitor particles were over-coated with urea. The central volatilization inhibitor particles were produced by granulating powdered MAP, boric acid, and a vitamin-mineral composition to form the central volatilization inhibitor particles. The vitamin-mineral composition contains the following components: vitamins A, C, D, E and K, thiamin, riboflavin, niacin, vitamin B6 and B12, folic acid, biotin, pantothenic acid, calcium, iron, phosphorus, iodine, magnesium, zinc, selenium, copper, manganese, chromium, molybdenum, chloride, potassium, boron, nickel, silicon, tin, vanadium, lutien, and lycopene. See the following Table 7 for a complete list of components and their amounts.

Industrial grade urea was melted and sprayed to overcoat the central volatilization inhibitor particles. The urea overcoating drum was 20" in diameter, 5" wide, 2" deep, with forty-1" lifting flights mounted 1½" apart inside the drum to assist in forming a falling curtain during melt spray granulation. The same type of drum was used to make the central volatilization inhibitor particles except that the drum contained no flights. The stainless steel granulation drum was mounted on a variable speed base. Approximately 1 pound of central volatilization inhibitor particles was placed inside the drum to form a falling curtain. The drum speed during granulation was 35-40 rpm. The fertilizer granules were produced by this process.

TABLE 7

Vitamin-Mineral Composition
"Equate (Tm) Complete Multivitamin" Supplement Facts
Serving Size: 1 Tablet

| Amount Per Serving: | | % DV |
|---|---|---|
| Vitamin A (29% as Beta Carotene) | 3500 I.U. | 70% |
| Vitamin C | 90 mg | 150% |
| Vitamin D | 400 I.U. | 100% |
| Vitamin E | 30 I.U. | 100% |
| Vitamin K | 25 mcg | 31% |
| Thiamin (Vit. B1) | 1.5 mg | 100% |
| Riboflavin (Vit. B2) | 1.7 mg | 100% |
| Niacin | 20 mg | 100% |
| Vitamin B6 | 2 mg | 100% |
| Folic Acid | 500 mcg | 125% |
| Vitamin B12 | 6 mcg | 100% |
| Biotin | 30 mcg | 10% |
| Pantothenic Acid | 10 mg | 100% |
| Calcium | 200 mg | 20% |
| Iron | 18 mg | 100% |
| Phosphorus | 109 mg | 11% |
| Iodine | 150 mcg | 100% |
| Magnesium | 100 mg | 25% |
| Zinc | 11 mg | 73% |
| Selenium | 55 mcg | 79% |
| Copper | 0.9 mg | 45% |
| Manganese | 2.3 mg | 115% |
| Chromium | 35 mcg | 29% |
| Molybdenum | 45 mcg | 60% |
| Chloride | 72 mg | 2% |
| Potassium | 80 mg | 2% |
| Boron | 150 mcg | ** |
| Nickel | 5 mcg | ** |
| Silicon | 2 mg | ** |
| Tin | 10 mcg | ** |
| Vanadium | 10 mcg | ** |
| Lutein ‡(*Tagetes erecta*) (flower) | 250 mcg | ** |
| Lycopene | 300 mcg | ** |

** Daily Value (DV) not established.
Other Ingredients:
Dicalcium Phosphate, Magnesium Oxide, Potassium Chloride, Calcium Carbonate, Cellulose, Ascorbic Acid, Ferrous Fumarate, Corn Starch, dl-Alpha Tocopheryl Acetate, Niacinamide, Polyvinyl Alcohol, Gelatin, Croscarmellose Sodium, d-Calcium Pantothenate, Crospovidone, Zinc Oxide, Magnesium Stearate, Titanium Dioxide, Polyethylene Glycol, Talc, Manganese Sulfate, Silicon Dioxide, Acacia, Maltodextrin, Hypromellose, Pyridoxine Hydrocholride, Glucose, Cupric Sulfate, Riboflavin, Thiamine Mononitrate, Vitamin A Acetate, Boric Acid, Sucrose, Folic Acid, Beta Carotene, Yellow 6 Lake, Chromium, Picolinate, Lycopene, Lutein, Potassium Iodide, Sodium Selenate, Sodium Molydate, Tricalcium Phosphate, Sodium Asorbate, Tocopherols, Red 40 Lake, Phytonadione, Biotin, Sodium Metavanadate, Nickelous Sulfate, Stannous Chloride, Cholecalciferol, Cyanocobalamin, Ascorbyl Palmitate Animal Nutrient Process Example 2

Fertilizer granules were produced comprised of central volatilization inhibitor particles containing (by wt.) 10% mono-ammonium phosphate (MAP), 1% boric acid, 1% vitamin-mineral composition, 1% potassium iodide, 1% zinc sulfate and 1% iron sulfate. The central volatilization inhibitor particles were over-coated with urea. The central volatilization inhibitor particles were produced by granulating powdered MAP, boric acid, vitamin-mineral, potassium iodide, to form the central volatilization inhibitor particles. The vitamin-mineral composition is the same as in Example 1.

The central volatilization inhibitor particles were over-coated with urea and fertilizer granules produced by the process as described in Example 1.

While only a few exemplary embodiments of this invention have been described in detail, those skilled in the art will recognize that there are many possible variations and modifications which may be made in the exemplary embodiments while yet retaining many of the novel and advantageous features of this invention. Accordingly, it is intended that the following claims cover all such modifications and variations.

What is claimed is:

1. A urea fertilizer having reduced ammonia volatilization upon application to soil comprising:
a central particle having an outer surface and comprising ammonia volatilization inhibiting compounds containing one or more of boron and iodine, wherein the ammonia volatilization inhibiting compounds are selected from the group consisting of disinfectants, cationic surfactants, weak acids and sulfonamides, and
a coating of urea on the outer surface of the central particle.

2. The urea fertilizer of claim 1, further comprising a second outer coating of urea over the first coating of urea resulting in a twice coated central particle.

3. The urea fertilizer of claim 1, wherein the compound containing boron is selected from the group consisting of boric acid, sodium tetraborate pentahydrate, sodium tetraborate decahydrate, and anhydrous sodium tetraborate.

4. The urea fertilizer of claim 1, wherein the compound containing iodine is selected from the group consisting of potassium iodine, sodium iodine, potassium iodate and sodium iodate.

5. The urea fertilizer of claim 1, wherein the ammonia volatilization inhibiting compound is boric acid, present in an amount of 0.01 to 5% by wt.

6. The urea fertilizer of claim 1, wherein the ammonia volatilization inhibiting compound is potassium iodine, present in an amount of 0.01 to 5% by wt.

7. The urea fertilizer of claim 1, wherein the central particle comprises in addition to the ammonia volatilization inhibiting compound, one or more of phosphorus and potassium compounds.

8. The urea fertilizer of claim 7, wherein the phosphorous compound is selected from the group consisting of diammonium phosphate, monoammonium phosphate, monopotassium phosphate, dipotassium phosphate, tetrapotassium pyrophosphate, and potassium metaphosphate.

9. The urea fertilizer of claim 7, wherein the potassium compound is selected from the group consisting of potassium chloride, potassium nitrate, potassium sulfate, monopotassium phosphate, dipotassium phosphate, tetrapotassium pyrophosphate, and potassium metaphosphate.

10. The urea fertilizer of claim 1, wherein the central particle comprises in addition to the ammonia volatilization inhibiting compound, one or more of calcium, magnesium, sulfur, copper, iron, manganese, molybdenum, and zinc.

11. The urea fertilizer of claim 1, wherein the central particle comprises in addition to the ammonia volatilization inhibiting compound, one or more human nutrients selected from the group consisting of iron, zinc, iodine, copper, magnesium and selenium compounds.

12. The urea fertilizer of claim 1, wherein size of the central particles ranges from 0.9 to 1.5 mm and the urea coated central particle size ranges from 2.50 to 3.60 mm.

13. A urea fertilizer having reduced ammonia volatilization upon application to soil comprising:
a central particle having an outer surface and comprising ammonia volatilization inhibiting compounds containing one or more of boron and iodine, wherein the compound containing boron is selected from the group consisting of boric acid, sodium tetraborate pentahydrate, sodium tetraborate decahydrate, and anhydrous sodium tetraborate, and wherein the compound containing iodine is selected from the group consisting of potassium iodine, sodium iodine, potassium iodate and sodium iodate, and
a coating of urea on the outer surface of the central particle.

14. A urea fertilizer having reduced ammonia volatilization upon application to soil comprising:

a central particle having an outer surface and comprising ammonia volatilization inhibiting compounds containing one or more of boron and iodine, wherein the ammonia volatilization inhibiting compound is boric acid, present in an amount of 0.01 to 5% by wt. or the ammonia volatilization inhibiting compound is potassium iodine, present in an amount of 0.01 to 5% by wt., and a coating of urea on the outer surface of the central particle.

15. A urea fertilizer having reduced ammonia volatilization upon application to soil comprising:

a central particle having an outer surface and comprising ammonia volatilization inhibiting compounds containing one or more of boron and iodine, wherein the central particle comprises in addition to the ammonia volatilization inhibiting compound, one or more of phosphorus compounds selected from the group consisting of diammonium phosphate, monoammonium phosphate, monopotassium phosphate, dipotassium phosphate, tetrapotassium pyrophosphate, and potassium metaphosphate, and a coating of urea on the outer surface of the central particle.

* * * * *